March 30, 1937. W. A. SERIGHT 2,075,475
CULTIVATOR ATTACHMENT
Filed Sept. 10, 1936
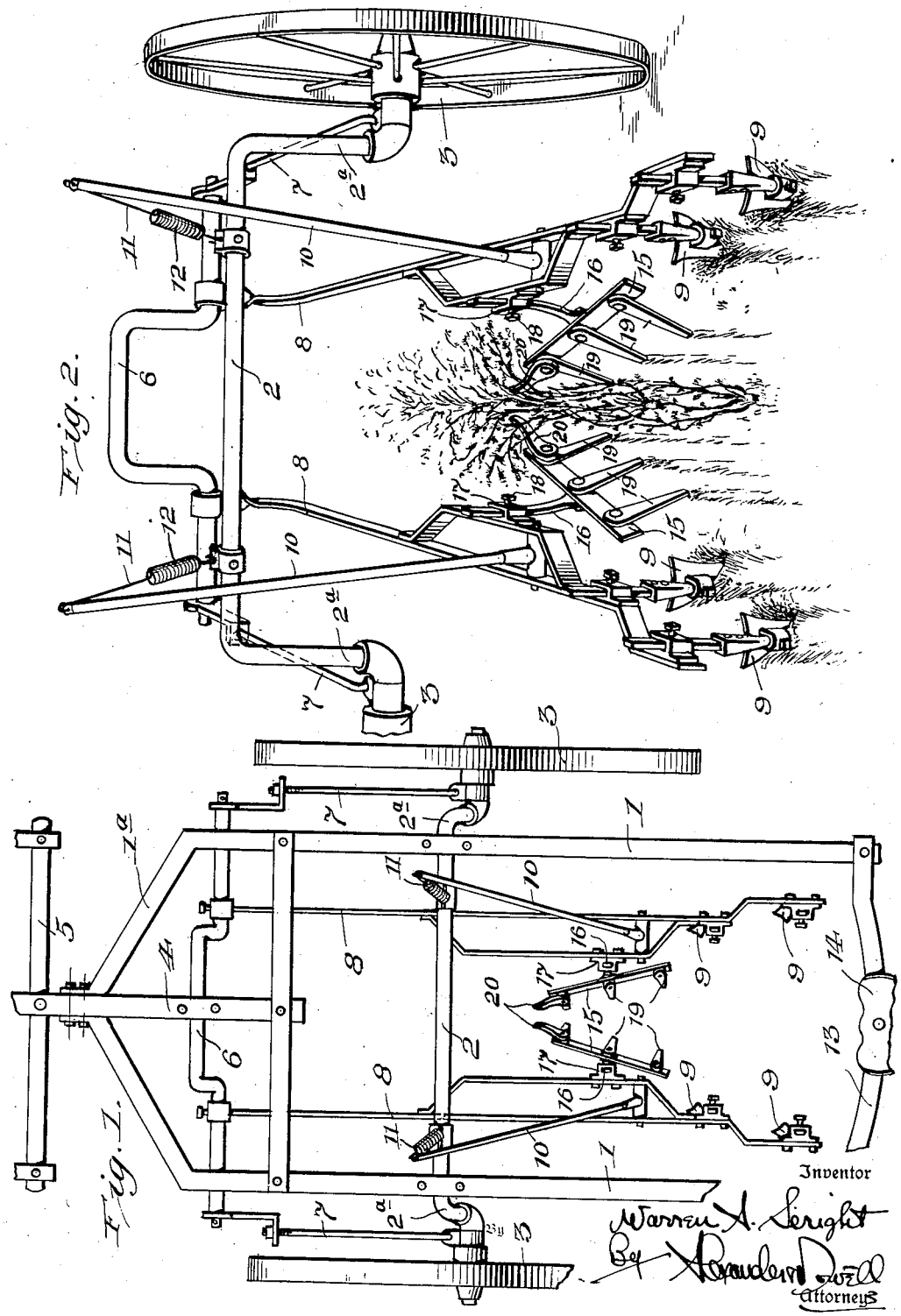

Patented Mar. 30, 1937

2,075,475

UNITED STATES PATENT OFFICE 2,075,475

CULTIVATOR ATTACHMENT

Warren A. Seright, Muscatine, Iowa

Application September 10, 1936, Serial No. 100,167

6 Claims. (Cl. 97—179)

This invention relates to cultivators, and the principal object thereof is to provide a pair of novel rake attachments which can be mounted in place of a pair of standard cultivator shovels, and the machine with the pair of rakes and the remaining cultivator shovels mounted thereon used for the cultivation of small plants such as sweet potato vines, melons, or any other vines, the rake attachments having fingers extending forwardly and downwardly in advance of the teeth thereof adapted to lift runners of the vines or plants out of the way of the rake teeth, thereby permitting cultivation close to the roots of or to the axis of the row of the vines, and eliminating the necessity of hand hoeing under the vine runners, thus effecting a material saving in time and work.

I will explain the invention with reference to the accompanying drawing which illustrates one practical embodiment thereof to enable others to adopt and use the same, and will summarize in the claims the novel features of construction, and novel combinations of parts, for which protection is desired.

In said drawing:—

Fig. 1 is a top plan view of a standard cultivator provided with my novel pair of rake attachments substituted for the innermost pair of standard cultivator shovels.

Fig. 2 is a rear partial perspective view, showing the cultivator with my attachments in operation along a row of vines, and showing the operation of the forwardly and downwardly projecting fingers in raising and moving the vine runners inwardly towards the axis of the row, so that the teeth of the rakes may pass under the runners closely adjacent to the roots of the vines.

The cultivator shown is of ordinary standard type, same consisting of a parallel side frame 1, in which an axle 2 is journaled, the outer ends of the axle being offset as at 2a and carrying the ground wheels 3. The forward ends 1a of the frame are converged and connected to a tongue 4 to which the usual draw bar 5 is pivotally connected. The rear ends of the frame members 1 are connected together by a member 13 which may carry an operator's seat 14. A pull bar 6 is mounted in the frame in advance of axle 2, and means such as adjustable links 7 are provided between the ends of the pull bar and the offset portions 2a of the axle, which links may be lengthened or shortened in any desired manner, to raise or lower the frame with respect to the wheels. Pivotally connected to the pull bar 6 at opposite sides of the axis of the cultivator are shovel supporting frames 8 of any suitable form adapted to carry the sockets 17 for the cultivator shovels 9 which are arranged in staggered relation, as indicated. Each frame 8 is yieldably urged downwardly, to cause the shovels to dig into the earth, by means of bars 10 the upper ends of which are yieldably depressed by wires 11 which have springs 12 interposed therein. The above parts are merely conventional and form no part of the present invention.

In place of the innermost pair of cultivator shovels 9 my novel rake attachments may be substituted, same consisting of substantially horizontal bars 15, each having an upstanding shank 16 at its center adapted to snugly fit the sockets 17 of the standard cultivator shovels, the shanks being held in adjusted position therein by set screw 18 shown in Fig. 2. Depending from each bar 15 are rake teeth 19 adapted to engage the ground adjacent the roots of the vines while the cultivator shovels 9 operate between the rows of vines in the usual manner as the cultivator is operating along the respective rows of vines, as indicated in Fig. 2. The bars 15 may be provided with a single tooth 19 or with any desired number. Preferably the shanks are bent or twisted in such manner that the bars 15 when mounted in the frames 8, converge towards their forward ends as clearly shown in the drawing, so that the rake teeth 19 of each bar 15 will be staggered.

Extending forwardly, downwardly and inwardly from the front end of each bar 15 is a finger 20. The outer ends of the fingers of each pair of rakes are disposed a relatively short distance apart, and are adapted to reach under the runners of the vines or plants and lift same, moving the runners inwardly towards the axis of the row, so that the rake teeth 19 (which are staggered in relation to each other) may operate in the area adjacent the axis of vines without injury or damage to the runners or vines, whereby the rows may be efficiently cultivated, dispensing with the necessity of hoeing under the runners adjacent the roots of the vines.

The attachments may thus be readily inserted in place of the innermost pair of cultivator shovels of any standard cultivator, and when it is desired to use the cultivator without the rakes the ordinary shovels may be readily replaced in the frames 8.

If more than one tooth 19 is used on each bar 15, the teeth should be arranged in staggered relation so that one tooth does not follow directly behind another, and so that the area of the rows which would normally be covered by the runners of the vines may be efficiently cultivated.

The attachment is particularly useful for cultivating sweet potato, melon, or any other vine products, since the fingers which project forwardly from the bars 15 move the runners inwardly towards the center of the rows so that the teeth 19 may cultivate the ground in the vicinity of the roots for the purpose of weeding and stirring the ground within such area.

I do not limit my invention to the exact form shown in the drawing, for obviously changes may be made therein within the scope of the claims.

I claim:—

1. An attachment for a cultivator comprising a member having teeth adapted to engage the ground adjacent a row of vines; a support for said member adapted to be substituted for a cultivator shovel arm and formed to maintain the member at an angle to the axis of the cultivator thereby staggering the teeth; and means for shifting the runners of the vines out of the path of the teeth.

2. In an attachment as set forth in claim 1, said support for the member comprising a shank adapted to engage one of the sockets that normally supports a cultivator shovel arm.

3. In an attachment as set forth in claim 1 said vine shifting means comprising a finger extending forwardly and downwardly from the leading end of the member.

4. A harrow attachment for a cultivator comprising a pair of members having teeth adapted to engage the ground at opposite sides respectively of a row of vines; a support for each member adapted to be substituted for a cultivator shovel arm, each support being formed to maintain each member so that the leading ends of said member converge, thus staggering the teeth; and means for shifting the runners of the vines inwardly towards the axis of the row in advance of the teeth.

5. In an attachment as set forth in claim 4, said supports for the member comprising shanks adapted to engage sockets which normally support cultivator shovel arms.

6. In an attachment as set forth in claim 4, said vine shifting means comprising fingers extending forwardly, downwardly and inwardly from the leading ends of the members.

WARREN A. SERIGHT.